US011567930B2

(12) United States Patent
Bhargava et al.

(10) Patent No.: US 11,567,930 B2
(45) Date of Patent: Jan. 31, 2023

(54) ADAPTIVE DATA RETRIEVAL WITH RUNTIME AUTHORIZATION

(71) Applicant: SAP SE, Walldorf (DE)

(72) Inventors: Apoorv Bhargava, Bangalore (IN); Madathiveetil Bipin, Bangalore (IN); Markus Schmidt-Karaca, Heidelberg (DE); Ismail Basha, Bangalore (IN); Gonda Marcusse, Kronau (DE); Vishnu Kare, Bangalore (IN); Praveen Kumar, Bangalore (IN); Neenu Vincent, Bangalore (IN)

(73) Assignee: SAP SE, Walldorf (DE)

( * ) Notice: Subject to any disclaimer, the term of this patent is extended or adjusted under 35 U.S.C. 154(b) by 750 days.

(21) Appl. No.: 15/497,106

(22) Filed: Apr. 25, 2017

(65) Prior Publication Data

US 2018/0307723 A1 Oct. 25, 2018

(51) Int. Cl.
*G06F 16/242* (2019.01)
*G06F 21/62* (2013.01)
(Continued)

(52) U.S. Cl.
CPC ........ *G06F 16/2425* (2019.01); *G06F 16/245* (2019.01); *G06F 16/2453* (2019.01);
(Continued)

(58) Field of Classification Search
CPC ............. G06F 16/2425; G06F 16/2468; G06F 16/245; G06F 16/2453; G06F 16/90324;
(Continued)

(56) References Cited

U.S. PATENT DOCUMENTS 7,568,153 B2  7/2009  Rethore et al.
7,698,252 B2  4/2010  Saus
(Continued)

OTHER PUBLICATIONS

SAP, "SAP Connection Discovery for Public Services Enhances Real-Time Decision Making Capabilities," downloaded from http://news.sap.com/sap-connection-discovery-for-public-services-real-time-decision-making/, 6 pp. (document marked Nov. 15, 2016).
(Continued)

*Primary Examiner* — Li B. Zhen
*Assistant Examiner* — Henry Nguyen
(74) *Attorney, Agent, or Firm* — Klarquist Sparkman, LLP

(57) ABSTRACT

Methods and systems are disclosed for data retrieval, from databases to clients, in an environment requiring runtime authorization. In response to a request for T data records, a learning module provides a prediction R of a suitable number of data records to retrieve from a database. Following retrieval of R records or record identifiers, authorization is sought from an authorization service, resulting in A of the records being authorized. The A authorized records are returned to the requesting client, and, if more records are needed, T is decremented and the cycle is repeated. A performance notification is provided to the learning module for training, with respect to providing values of prediction R. The performance notification can be based on a measure of authorization service performance, the number A of authorized records, latency, communication or resource costs, a measure of resource congestion, or other parameters. Variants are disclosed.

20 Claims, 10 Drawing Sheets

(51) Int. Cl.
    *G06F 16/245*     (2019.01)
    *G06F 16/2453*     (2019.01)
    *G06F 16/2457*     (2019.01)
    *G06F 16/2458*     (2019.01)
    *G06F 16/9032*     (2019.01)

(52) U.S. Cl.
    CPC ...... *G06F 16/2457* (2019.01); *G06F 16/2468* (2019.01); *G06F 16/90324* (2019.01); *G06F 21/6227* (2013.01); *G06F 2221/2141* (2013.01)

(58) Field of Classification Search
    CPC ............. G06F 16/2457; G06F 21/6227; G06F 2221/2141
    See application file for complete search history.

(56) References Cited

U.S. PATENT DOCUMENTS

| | | | |
|---|---|---|---|
| 8,161,054 | B2 | 4/2012 | Dettinger et al. |
| 8,972,853 | B2 | 3/2015 | William |
| 2007/0079236 | A1 | 4/2007 | Schrier et al. |
| 2008/0104013 | A1* | 5/2008 | Saus ............... G06F 16/24534 |
| 2011/0055198 | A1* | 3/2011 | Mitchell ............. G06F 16/2455 707/E17.136 |
| 2012/0102062 | A1* | 4/2012 | Gurnani ............. G06Q 30/0601 707/769 |
| 2012/0330925 | A1* | 12/2012 | Ramamurthy .... G06F 16/24534 707/718 |
| 2014/0026187 | A1 | 1/2014 | Johnson et al. |
| 2014/0181079 | A1* | 6/2014 | Ghazal ............. G06F 16/24545 707/718 |
| 2016/0171236 | A1* | 6/2016 | Konik ................ G06F 21/6227 707/784 |
| 2016/0306779 | A1 | 10/2016 | Phillips et al. |
| 2017/0063986 | A1* | 3/2017 | Gopal ................ H04L 67/1095 |
| 2017/0186084 | A1* | 6/2017 | Koch .................... G06Q 40/02 |
| 2017/0220761 | A1* | 8/2017 | Toupin .................. G16H 20/10 |
| 2017/0331879 | A1* | 11/2017 | Banister .............. G06F 16/2237 |
| 2017/0344749 | A1* | 11/2017 | Yang .................. G06F 16/9535 |
| 2018/0165344 | A1* | 6/2018 | Williams .............. G06F 16/275 |

OTHER PUBLICATIONS

SAP, "SAP Connection Discovery for Public Services," downloaded from https://blogs.sap.com/2016/11/29/sap-connection-discovery-for-public-services-the-next-generation-of-software-for-public-services/, 3pp—(document marked Nov. 29, 2016).

Martin Fowler, "Microservices," downloaded from https://martinfowler.com/articles/microservices.html, 16pp. (document marked. Mar. 25, 2014).

SAP, "Microservices on SAP HANA Cloud Platform," downloaded from https://blogs.sap.com/2015/11/24/microservices-on-hcp/, 4pp. (document marked Nov. 24, 2015).

SAP, "Microservices on HCP—Part II," downloaded from https://blogs.sap.com/2015/11/26/microservices-on-hcp-part-ii/, 9pp. (document marked Nov. 26, 2015).

SAP, "Remote Authentication," downloaded from https://help.sap.com/saphelp_nw73ehp1/helpdata/en/ac/ce417acc9a4d48aa52fa562cb9b194/frameset.htm on Apr. 25, 2017, 8pp.

* cited by examiner

ADAPTIVE DATA RETRIEVAL WITH RUNTIME AUTHORIZATION

BACKGROUND

In security-conscious environments, databases can grow, access policies can change, and networked applications can span the globe. In such environments, it is not always practical to have pre-authorized records readily available for client access, and runtime authorization of individual records can be required from an authorization service that is not co-located with the data. In such environments, it can be challenging to efficiently deliver data in response to a request. Thus, there remains a need for improved technologies for managing data retrieval when runtime authorization is required.

SUMMARY

In summary, the detailed description is directed to various innovative technologies for adaptive data retrieval in environments where runtime authorization is required. Examples of disclosed technologies use a learning module to predict a number of records to retrieve for a target number of requested records. A middleware module coordinates between one or more clients, databases, authorization services, and the learning module. The middleware module provides performance indicators to the learning module for tuning predictions.

According to one aspect of the innovations described herein, a data retrieval system comprises a middleware subsystem and a learning subsystem hosted on one or more computing nodes. The middleware subsystem is communicatively coupled between one or more clients and one or more databases, and is also communicatively coupled to the learning subsystem, one or more authorization services, and, optionally, an identity service. The middleware subsystem can be configured to process and respond to requests from the one or more clients, interact with the learning subsystem, interact with the one or more external authorization services, and access the one or more databases. Within the middleware subsystem, a client adapter module can be configured to receive, in the form of a request message, a request for data records from a client, and to respond with one or more batches of authorized data records. Within the middleware subsystem, a database interface module can be configured to issue requests to coupled databases, and receive in response a set of identifiers of data records or the data records themselves. Within the middleware subsystem, an authorization interface module can be configured to issue requests to coupled authorization services and receive identifiers of authorized data records in response. Within the learning subsystem, a prediction module can be configured to provide a retrieval operation count, or R, that indicates a number of data records or identifiers to be retrieved; in examples, the retrieval operation count is at least partly dependent, directly or indirectly, on one or more configuration parameters, performance parameters, and/or client parameters. These parameters can include performance of an authorization service, yield from authorization requests, number of round-trips required to fulfill a client request, and/or weighted costs. These parameters can also include a number of data records sought to be returned to the requesting client, dubbed the "target result count", or T. In examples, a retrieval control adapter within the middleware subsystem can be configured to send a request to the prediction module indicating the target result count; receive, from the learning module, a retrieval operation count; and send to the learning subsystem one or more performance indicators. Within the learning subsystem, an update module can be configured to update or train the prediction module based upon the performance indicators.

In various examples, the client request can specify a maximum number of data records being requested, a batch size, a filter, a database query, a user identifier, an authorization token, a control command, or other parameters or flags. In various examples, the client adapter can respond to the requesting client piecemeal as authorized data records are identified, in batches, or in full display pages, accumulating authorized data records as necessary.

Within the middleware subsystem, an authorization interface module can be configured to send a set of data record identifiers to an authorization service, and receive in response an indication of a subset of these identifiers corresponding to authorized data records. In some examples, the authorization service can be external to or remote from the middleware subsystem, while in other examples, the authorization service can be co-located with at least part of the middleware subsystem.

In various examples, one or more databases and/or authorization services can be integrated with or part of the data retrieval system. The learning module and the middleware subsystems can be hosted on different computing nodes, or part or all of the learning module can share a computing node with part or all of the middleware subsystem.

In another aspect of the disclosed technologies, a computer-implemented method is provided for managing data record requests received from clients (e.g., applications). In examples, a target result count can be set to a maximum number of data records that fit on a display page of the requesting client or client device. In examples, a message (optionally including the target result count) is sent to a learning module, and the learning module responds with a retrieval operation count, which indicates a number of data records to retrieve. Then, this number of data records can be sought from a database in accordance with the client request; the record request to the database can include parameters such as a database query, a filter, or other parameters or flags, forwarded from the client request. The database can return identifiers of available data records, or the available data records themselves, up to the retrieval operation count in number. The set of identifiers of available data records is submitted to a remote authorization service, which responds with a subset of identifiers corresponding to authorized data records among the available data records. The authorization request to the authorization service can include a user or client identifier, an authorization token, or other parameters or flags forwarded from the client request. In various examples, the exchange of identifiers with the authorization service can be implemented with a list of identifiers, with another data structure, with indirect indexing, or with compression. A performance indicator can be generated and sent to the learning module. The performance indicator can be based on authorization service performance, the yield of authorized data records, and/or other cost measures. Authorized data records can be retrieved from the database if necessary, and can be returned in response to the client request. If the target result count has not been met, the target result count can be decremented and the above cycle of actions repeated.

In various examples, the authorized data records can be returned at each cycle, or accumulated over one or more cycles until a threshold count of authorized data records is reached, or until a full page display of records is reached, and then returned to the requesting client. In various examples, the database and/or the learning module can be locally accessible as part of the computer system.

The learning module can receive a request for a retrieval operation count R corresponding to a desired target result count T, apply a prediction procedure to determine the retrieval operation count, and respond with the determined retrieval operation count. The learning module can also receive a performance notification, and apply an update procedure to update the prediction procedure. In various examples, the performance notification can include or can be based on any combination of the count of authorized data records A, a ratio of the count of authorized data records (e.g. a yield measure), a performance measure of the authorization service, performance measures for communications with the database or the authorization service, a latency, an overall response time, other cost measures, a client or user identifier, a filter or database query included in the client request, or other parameters or flags. Communication performance measures can include elapsed time, charged time, monetary cost, or a filtering rate associated with the communications. For each target result count, a goal number G can be established which can be the same as the target result count, or different. In some examples, the performance notification can indicate a yield number, which can be the number of authorized data records obtained. Through comparison of the goal number with the yield number, the update procedure can make a determination whether the prediction procedure should be adjusted to increase the retrieval operation count or decrease the retrieval operation count or leave the retrieval operation count unchanged. In varying examples, the scope of updating the prediction procedure can be limited to predictions for a particular target result count, or to a range of target result counts, or can extend with or without weights to substantially all values of target result counts.

The innovations can be implemented as part of one or more methods, as part of one or more computing systems adapted to perform an innovative method, or as part of non-transitory computer-readable media storing computer-executable instructions for causing a computing system to perform the innovative method(s). The various innovations can be used in combination or separately. The foregoing and other objects, features, and advantages of the invention will become more apparent from the following detailed description, which proceeds with reference to the accompanying figures.

DETAILED DESCRIPTION

Overview and Example Environment

Figure 1:
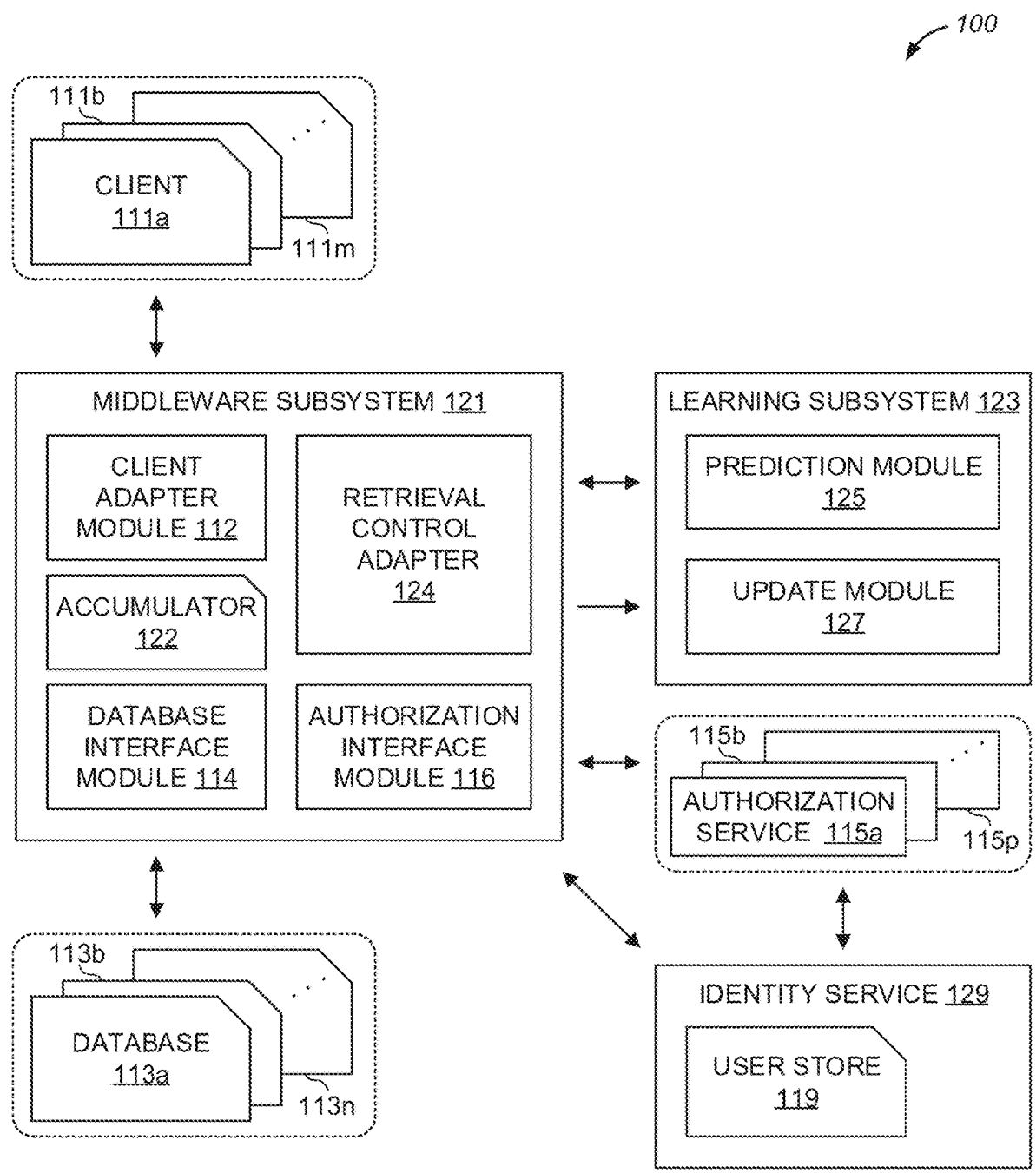
FIG. 1 is a diagram depicting a system and environment according to disclosed technologies.

FIG. 1 depicts a system and environment according to disclosed technologies, where one or more clients 111a-111m are configured to access data records from one or more databases 113a-113n through a middleware subsystem 121. For a variety of reasons, an authorization service, e.g., 115a, can be separated from the databases 113a-113n. In some examples, authorization is controlled at a single managed point, while large databases can be replicated and widely dispersed, so as to be available close to clients or points of use. In other examples, access policies can be complex and can change over time, so that two users can be authorized to access different sets of records today, and one of the two can gain additional access privileges tomorrow. For such reasons, it can be preferred to provide authorization as a runtime service, rather than as an unwieldy and unmanageable add-on to a database. In such environments, the middleware subsystem 121 can query the databases 113a-113n in response to a client request, and can determine which records are available satisfying the request, but cannot release those records to the client until they have been authorized by an authorization service 115a.

It can also be desirable to distribute the workload of a client's data request over time, so as to avoid congesting the database 113a and network resources for other clients, particularly if the client request, or an intermediate operation that follows, could generate a very large set of results. Conveniently, responses to the client can be provided one display page at a time, or according to some other batch size.

Furthermore, the success rate of authorization can vary widely, depending on factors including the client's or user's access privileges, the particular database being queried, and even the nature of the query itself. For example, in a law enforcement, healthcare, or government records setting, queries that do not involve any personally identifying information can be more readily authorized than those that do return personally identifying information. In a corporate setting, different data stores can be authorized for select individuals within an organization, generally to all individuals within the organization, accessible to certain partners outside the organization, or even to the general public. In examples, the success rate for authorization in highly restricted databases can be as low as 20%, 10%, 5%, 1%, or even lower, while the success rate for authorization in more permissive databases can be as high as 80%, 90%, 95%, 99% or even higher. The disclosed technology can be applied without modification for such widely varied success rates, and can automatically configure itself through training for efficient operation in all these cases.

In view of such factors, it can be difficult to predict how many records the middleware subsystem 121 should seek in order to efficiently utilize resources and efficiently respond to a client request. This number is dubbed "retrieval operation count," or R, herein, and is not fixed. Faced with a request for, e.g., 50 records, the middleware subsystem 121 could request up to 60 records from the database, but if only 5 are authorized, then many roundtrips will be incurred before the client request is satisfied, which can be inefficient and costly. With the same parameters, a request for 600 records could yield 50 authorized records, efficiently using resources to retrieve the target count of data records. Under different circumstances, however, a request for 600 records could yield 450 authorized records, which is far more than required, and can also be inefficient in terms of use of the databases 113a-113n and/or authorization services. However, even if the request for 600 records is efficient, it can incur a long response time and can congest computing, network, and/or storage resources to the detriment of other clients or applications, and can be undesirable.

Learning subsystem 123 addresses such problems by making predictions for the retrieval operation count and using performance information to update its predictions for subsequent queries.

The disclosed technologies can provide advantages for efficient, secure, shared access to databases in areas such as law enforcement, government public services including social services, bank and credit card fraud detection, and healthcare records.

Definitions

As used in this disclosure, the term "database" refers to an organized collection of data maintained on computer-readable media and accessible by execution of instructions at one or more processors. Databases can be relational, in-memory or on disk, hierarchical or non-hierarchical, or any other type of database.

As used in this disclosure, the term "learning" is applied to a computing module that over time can update itself, based on feedback from earlier trials, to improve the module's performance with respect to a goal.

As used in this disclosure, the term "message" refers to any communication from one computing entity to another computing entity. Each computing entity can be a hardware (e.g., processor, network card, memory), software (application, device driver), or firmware (e.g., instructions running from ROM) entity. Software and firmware are ultimately executed in hardware.

As used in this disclosure, the term "middleware" refers to software that provides services, other than operating system services, to clients (e.g., software applications).

As used in this disclosure, the term "request" refers to any message to which a substantive response is expected, that is, a response beyond an acknowledgment. In contrast, a "notification" need not receive a substantive response.

As used in this disclosure, the term "send" denotes any way of conveying information from one component or module to another component/module, and the term "receive" denotes any way of getting information at one component/module from another component/module. The two components/modules can be part of the same computer system or different computer systems. The information can be passed by value (e.g., as a parameter of a message or function call) or passed by reference (e.g., in a buffer). Depending on context, the information can be communicated directly between the two components/modules or be conveyed through one or more intermediate components/modules.

An Example System

FIG. 1 is a diagram 100 depicting a system and environment according to disclosed technologies. A data retrieval system comprises middleware subsystem 121 and learning subsystem 123 hosted on one or more computers. The middleware subsystem 121 is coupled between one or more clients 111a-111m and one or more databases 113a-113n, and is operable to process and respond to client requests for data records by providing data records retrieved from the databases 113a-113n, subject to authorization. Middleware subsystem 121 is also coupled to one or more authorization services 115a-115p, to learning subsystem 123, and optionally to an identity service 129. The middleware subsystem 121 can be configured to interact with the learning subsystem 123 to perform efficient data retrievals and to provide information usable to train the learning subsystem 123. The middleware subsystem 121 can be configured to interact with the one or more external authorization services 115a-115p to obtain authorization at runtime for release of data records to a requesting client 111a-111m. The middleware subsystem 121 can be configured to access the one or more databases 113a-113n to obtain available data records or record identifiers in response to a client request, or authorized data records in response to authorization from an authorization service 115a-115p. The middleware subsystem 121 can be configured to interact with an identity service 129, which includes user store 119 of information about clients and users, to authenticate a client or user.

Within the middleware subsystem 121, interactions with clients 111a-111m can be managed by client adapter module 112. Client adapter module 112 can be configured to receive request messages from one of the clients 111a-111m, which can represent requests for data records. During or following processing of a request message, client adapter module 112 can be configured to respond to the client request with one or more batches of authorized data records. Client adapter module 112 can also be configured to accumulate authorized data records in accumulator 122 until a threshold number of records, such as a page length, has been reached. The page length can denote a maximum number of data records that can be accommodated on a display page of the requesting client's display device.

Within the middleware subsystem 121, interactions with databases 113a-113n can be managed by database interface module 114. Database interface module 114 can be configured to issue data requests to one of the databases 113a-113n, and receive data records or data record identifiers in return. Data requests can be issued initially in response to a client request, and can include a database query, a filter, or another parameter from the client request. Initial data requests can also include a retrieval operation count indicating a desired number of available records to be returned. The response to an initial request can be a set of identifiers of available data records, up to the retrieval operation count, or the available data records themselves. In examples where the initial request returns identifiers, the data interface module 114 can be configured to issue secondary data requests to one of the databases 113a-113n, after authorization, in which identifiers of authorized data records are submitted to one of the databases 113a-113n, and the authorized data records are obtained in response.

Within the middleware subsystem 121, interactions with authorization services 115a-115p can be managed by authorization interface module 116. Authorization interface module 116 can be configured to issue an authorization request to one of the authorization services 115a-115p, the request including a set of identifiers of available data records, and receive in return a set of identifiers of authorized data records; the authorized data records forming a subset of the available data records. Although described as a single request, one or both of the authorization request and the authorization response can, in examples, be split into multiple messages.

Within the middleware subsystem 121, interactions with learning subsystem 123 can be managed by retrieval control adapter 124. Retrieval control adapter 124 can be configured to send a request to the learning subsystem 123, and receive a retrieval operation count in response. Retrieval control adapter 124 can be further configured to send performance notifications to the learning subsystem 123, so as to provide information usable to train predictions of the learning subsystem 123.

As shown in FIG. 1, learning subsystem 123 can include a prediction module 125 and an update module 127. Prediction module 125 can be configured to receive a request for a retrieval operation count and respond with a corresponding predicted retrieval operation count, according to it most up-to-date trained state. Update module 127 can be configured to receive performance notifications and cause corrections to be made to train the prediction module 125 and improve the accuracy of retrieval operation count predictions. In some examples, the functions of prediction module 125 and update module 127 can be implemented integrally within a single module.

In examples, databases 113a-113n can be consolidated databases mirroring one or more source databases located elsewhere. Each source database can be associated with a respective one of authorization services 115a-115p, which can be co-located with the source databases.

In various examples, any combination or subcombination of learning subsystem 123, authorization services 115a-115p, identity service 129, and/or databases 113a-113n can be co-hosted on one or more shared computer nodes with each other or with at least part of middleware subsystem 121. In various examples, such combinations and subcombinations can be hosted on distinct computer nodes. A computing node can include one or more processors, memory coupled to the processors, and one or more network adapters, in addition to other components as are described herein or known in the art.

A computing system according to the disclosed technologies need not include all the components shown in FIG. 1. In some examples, a computing system can include only middleware subsystem 121 and learning subsystem 123; such a computing system can work co-operatively with other depicted components. In other examples, a computing system can include one or more of clients 111a-111m, databases 113a-113n, authorization services 115a-115p, or identity service 129, in addition to all or merely part of middleware subsystem 121 and learning subsystem 123. In further examples, a computing system can include only middleware subsystem 121, only learning subsystem 123, or merely parts and subcombinations of middleware subsystem 121 and learning subsystem 123. In various examples, subsystems, modules and components can be co-located, distributed, or even movably situated among hardware components of a computing cloud.

A First Example Method

Figure 2:
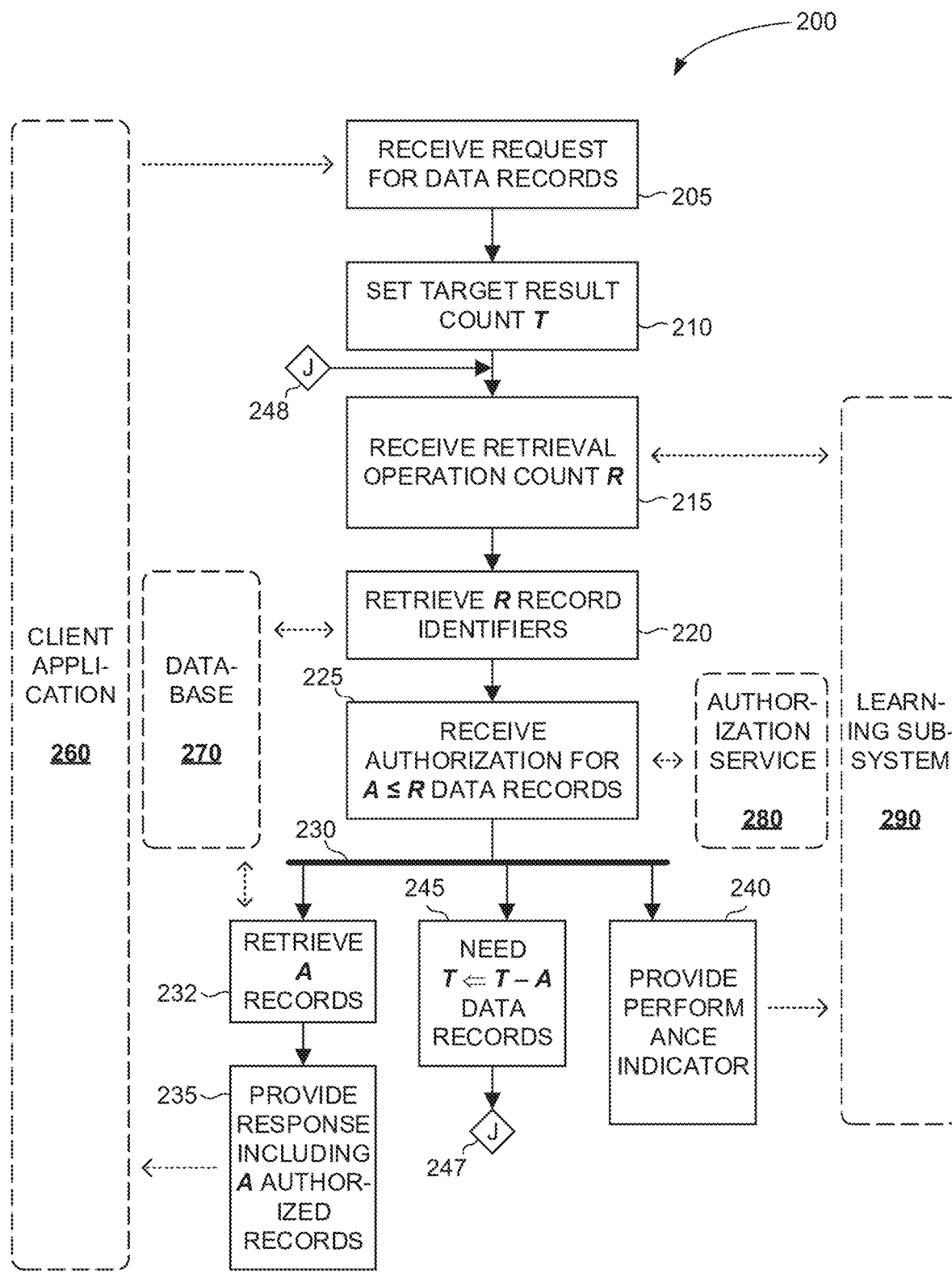
FIG. 2 is a flowchart of a method of operation of a data retrieval system according to disclosed technologies.

FIG. 2 is a flowchart 200 of a method of operation of a data retrieval system according to disclosed technologies. In brief, the data retrieval system receives a client request (process block 205), sets a target result count (210), is informed how many data records to request (215), retrieves identifiers of available records (220), and receives authorization for at least a subset of the available records (225). After retrieving authorized records (232), the authorized records are returned to the requesting client (235). A performance indicator is also sent (240) to the learning subsystem. If further records are required, a target number of data records is decremented (245) and the method returns to 215. The method continues until the target number of data records has been returned to the requesting client, or no more data records are available in database 270.

At process block 205, the data retrieval system receives a request from a client application 260 for data records. In examples, the client request can specify a number of records, or it can be an open request for all records matching, e.g., a database query. Thus, a target record count T can be set at process block 210 based on the specified number of records, or on a known display page size for the requesting client, or some other batch size.

At process block 215, the data retrieval system obtains a retrieval operation count R, from learning subsystem 290. In some examples, the retrieval operation count R is uniform across all contemporaneous requests and does not expressly depend on target record count T, while in other examples the value of T is provided to learning subsystem 290, and the obtained retrieval operation count R corresponds to the target record count T. At process block 220, the data retrieval system accesses database 270 and receives the next batch of up to R data records. In some cases, the data retrieval system can issue a record request for R data records, and receive R data records or identifiers in response. In other cases, database 270 may not have R records matching the record request, and the received data records can fall short of R. Accordingly, a record request for R records can be regarded as a request for up to R records. In some examples, the received records include one or more data fields, while in other examples, the records are received as a set of identifiers, which are indicators of or proxies for the actual data records. Following process block 220, up to R available data records are determined, but could still require authorization before remittance to the requesting client.

At process block 225, the data retrieval system accesses authorization service 280 to seek authorization for the (up to) R records, and receives authorization for A records, where A≤R. In some examples, the data retrieval system can submit a set of R data record identifiers in an authorization request to authorization service 280, and receive a set of A identifiers in response. At process block 230, an up to three way fork is made. At optional process block 232, if the data records have not already been retrieved, identifiers of authorized data records can be used to retrieve the authorized data records from database 270. At process block 235, the A authorized records can be returned to the requesting client. In examples where process block 220 provides data records with required fields, the data retrieval system is in possession of the A records locally and can respond to the requesting client directly with process block 232 being omitted.

In some examples, authorized data records are not returned to the client immediately at process block 235, but can be accumulated until a threshold number of authorized data records is reached, which can be more efficient for communications between the data retrieval system and clients, and can also provide a better user experience at the clients. In some examples, the threshold number can correspond to a full page of a client's display, or less than a page, or more than a page.

At process block 240, a performance indicator is determined and sent to learning subsystem 290. In an example where T=50, R=100, and A=20, the performance indicator can include a measure of the yield, such as A (=20), or A/T (=0.40), or A/R (=0.20). The performance indicator can alternatively or additionally include an indication of resource usage, such as a measure of processing time or processing cost reported by database 270 or authorization service 280. The performance indicator can also include a measure of network communication time or communication cost for the transactions at process blocks 220 or 225, or at a subsequent retrieval of authorized records prior to process block 235. The performance indicator can also include a measure of latency or response time as seen by the requesting client, or a measure of resource congestion.

At process block 245, the target record count T is decremented by the number of authorized records determined at 225. In the example above with T=50 and A=20, T is decremented to 50−20=30, the number of data records remaining to fulfill the client request or to achieve the original target record count. The method jumps from marker 247 back to marker 248 to continue at process block 215, for retrieval of the next batch of data records. In some examples the jump destination 248 can be located between process blocks 215 and 220 instead.

A Second Example Method

Figure 3:
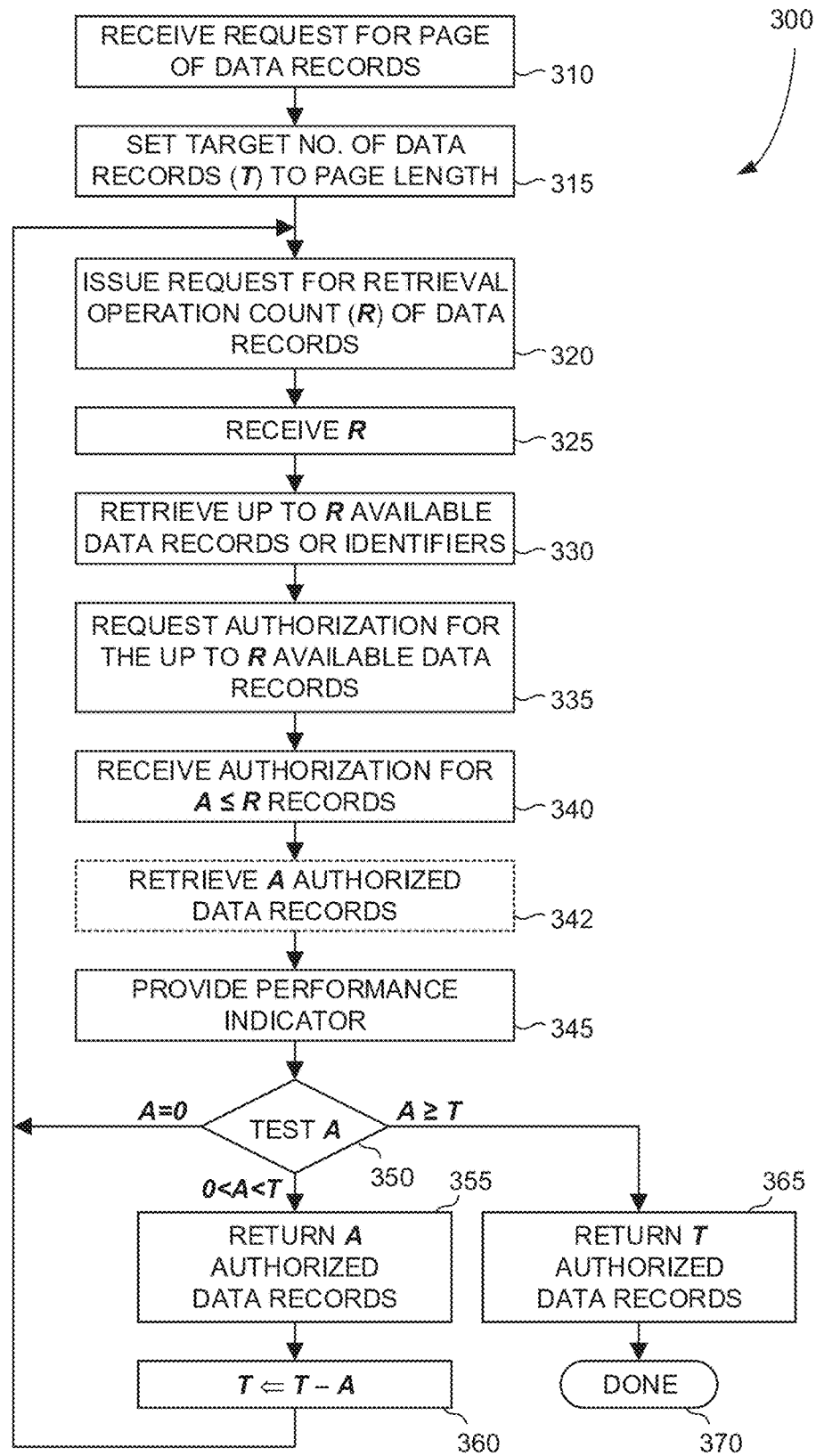
FIG. 3 is a flowchart of another method of operation of a data retrieval system according to disclosed technologies.

FIG. 3 is a flowchart 300 of another method of operation of a data retrieval system according to disclosed technologies. The method begins at process block 310, with a request for a page of data records being received. In examples, the number of data records to fill a page (dubbed "page length") can be in the range of 20-50 data records, or 10-100 data records, or 5-200 data records, or 2-500 data records, or as small as one data record, or as large as 10,000,000 data records.

At process block 315, a target number of data records T is set equal to the page length. At process block 320, a retrieval count request is issued to a learning subsystem for a retrieval operation count. In some examples, the retrieval count request incorporates the value T. In other examples, the value of T can be omitted as being predetermined or being a global constant within the environment. In further examples, the retrieval count request can include a client identifier, or an identifier of a client type, from which T can be determined. In other examples, the learning subsystem can push a retrieval operation count R to the middleware subsystem on every update, and process block 320 can be omitted.

At process block 325, the retrieval operation count R is received from the learning subsystem. At process block 330, the next batch of up to R available data records or identifiers are retrieved from a database. In some examples, it is preferred to retrieve only data record identifiers, because only identifiers are required for determining authorization, and it can be more efficient to retrieve only authorized data records, after authorization has been determined. In other examples, it can be more efficient to retrieve the data records directly in a single operation at process block 330, instead of going back for a second retrieval operation subsequently. If the data records are retrieved at process block 330, their identifiers are also obtained. In some circumstances, the number of available records or identifiers returned can be less than R (e.g., if a query does not return many data records).

At process block 335, an authorization request is issued to an authorization service for authorization of the R (or, in some cases, less than R) available records. At process block 340, authorization is received for A≤R data records. In some examples, the authorization request includes the target number T, and the authorization service can simply stop once A=T authorized data records have been determined. At optional process block 342, the authorized data records are retrieved from the database, in examples where the data records were not already retrieved at process block 330. At process block 345, a performance indicator is assembled and sent to the learning subsystem. In some examples, the performance indicator is based at least partly on the value of A, while in other examples, the performance indicator is based on the processing time of the authorization service or some other resource usage parameter, and is not directly dependent on A.

At process block 350, the value of A is tested. If A=0, a further search can be made by returning to process block 320. If 0<A<T, then the A authorized data records are returned to the requesting client at process block 355, T is decremented by A at process block 360, and the method returns to process block 320 to attempt to obtain additional authorized data records. Finally, if A≥T, then T authorized data records are returned to the client at process block 365, and the method is complete.

For the case A>T, extra authorized records are available. In varying examples, the extra records can be handled in different ways. Extra records can be discarded, or they can be stored in an accumulator (such as accumulator 122) in anticipation of a subsequent request, or they can be returned to the requesting client for management or optional caching at client-side. As described herein, authorization services can also be configured to stop once A=T authorized records have been determined, thereby avoiding the A>T condition.

The illustrated method can also terminate in other ways, not shown in FIG. 3. For example, if at process block 330, no available data records or identifiers are returned, it can be due to exhaustion of the database (that is, lack of responsive data records) for the current client request, and the method can terminate immediately. A related condition can occur when the number of data records or identifiers returned at process block 330 is less than R, which can also be due to database exhaustion. However, in this case there could be authorized data records among the available data records, and the method proceeds past process block 350, but terminates before returning to process block 320.

An Example Dataflow

Figure 4:
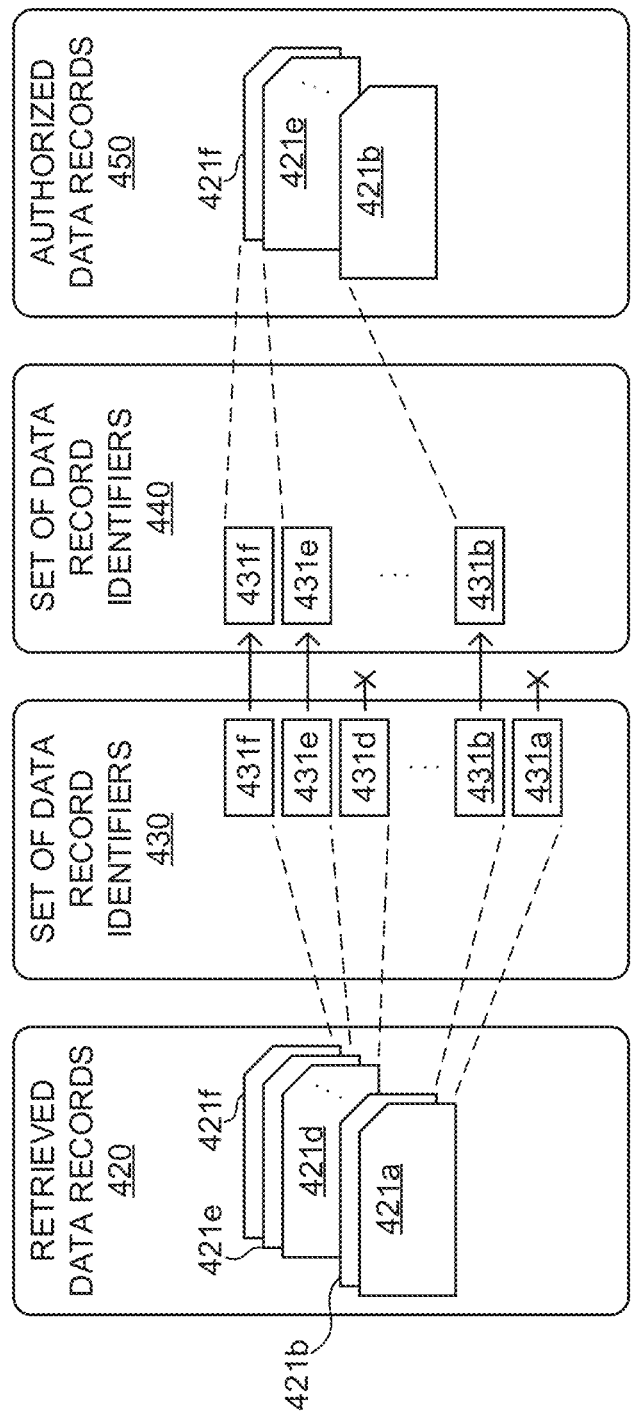
FIG. 4 is a diagram illustrating operation of disclosed technologies from a data flow perspective.

FIG. 4 is a diagram 400 illustrating operation of disclosed technologies from a data flow perspective. At flow point 420, available data records 421$a$-$b$ and 421$d$-$f$ have been retrieved from a database, e.g., after process block 330 of FIG. 3. The database could also contain records 421$c$, 421$g$, however, in the example shown, data records 421$c$, 421$g$ did not meet the parameters of a client request and were not retrieved. At flow point 430, a first set of identifiers {431$a$-$b$; 431$d$-$f$} of the retrieved data records is sent to an external authorization service, e.g., at process block 335. At flow point 440, a second set of identifiers, {431$b$; 431$e$; 431$f$}, of authorized data records is received from the external authorization service, e.g., at process block 340. Data records 421$a$, 421$d$ (having respective identifiers 431$a$, 431$d$) were not authorized, as indicated by X marks between flow points 430 and 440. Finally, at flow point 450, the authorized data records 421$b$ and 421$e$-$f$ are themselves gathered, e.g., at process block 342.

An Example Sequence Diagram

Figure 5:
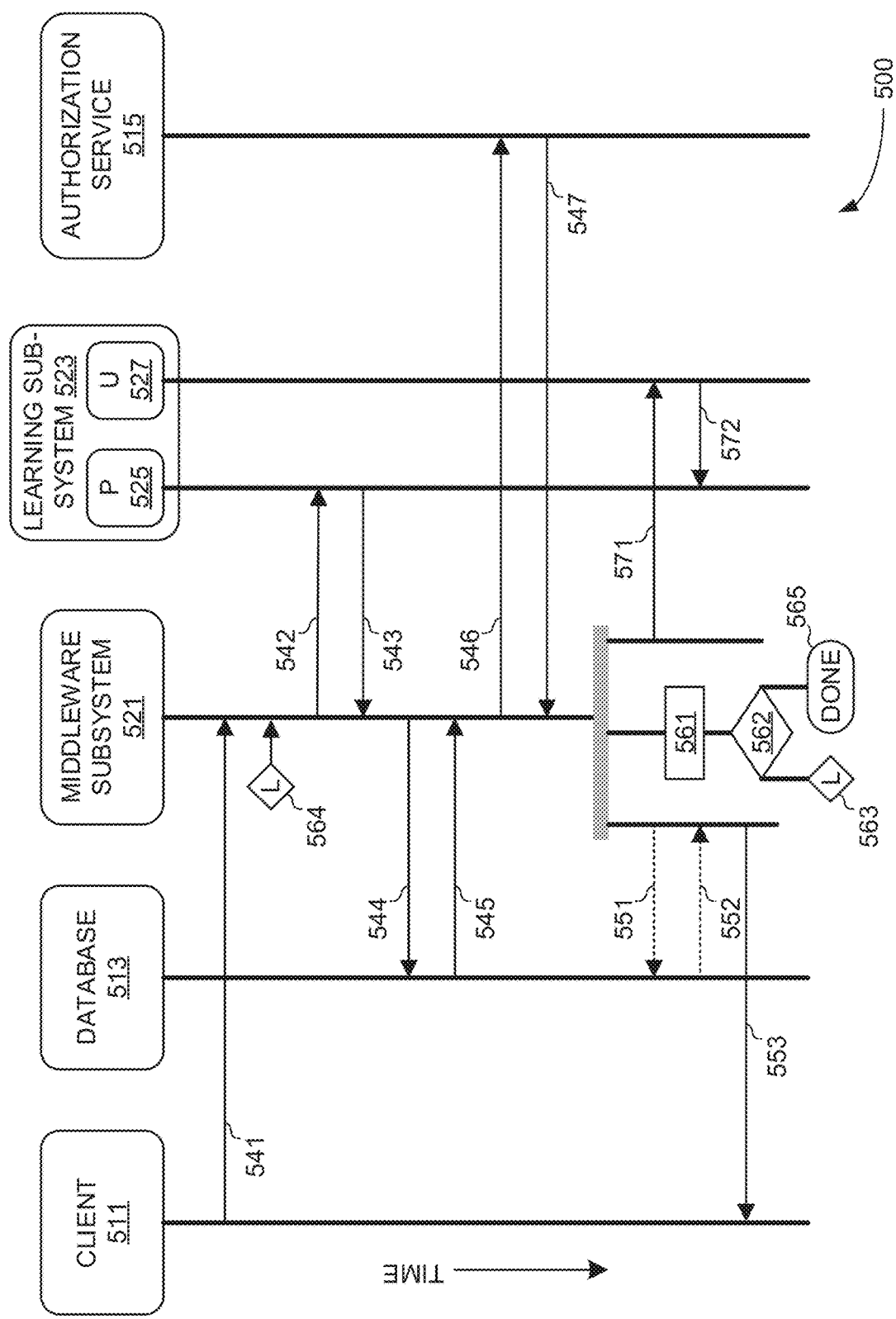
FIG. 5 is a sequence diagram of a method of operation of a data retrieval system according to disclosed technologies.

FIG. 5 is a sequence diagram 500 of a method of operation of a data retrieval system according to disclosed technologies. The diagram shows coordinated interactions of a middleware subsystem 521 with client 511, database 513, learning subsystem 523, and authorization service 515.

The illustrated method begins with a request 541 from client 511 to the middleware subsystem 521, which can be a request for data records. The middleware system issues a retrieval count request 542 to a prediction module "P" 525 of learning subsystem 523. Prediction module 525 can perform a trained prediction procedure to obtain a retrieval operation count, following which the retrieval operation count is provided to the middleware subsystem 521 at 543. The middleware subsystem 521 requests the corresponding number of records (or identifiers) from database 513 at 544, and is provided with up to the requested number of identifiers (or available data records) at 545. At 546, after preparation of an authorization request, the middleware subsystem 521 requests authorization of the available data records from authorization service 515, and is provided authorization for a subset of the available data records at 547. The subset can be none, some, or all of the available data records. At this point, three tasks can be forked. In examples where identifiers of data records are returned at 545, it is necessary to retrieve the actual authorized records from database 513; this request is issued at 551, and the actual authorized records are obtained at 552. In other examples, where actual data records are returned at 545, the handshake 551-552 can be omitted. Having obtained the authorized records at either 545 or 552, middleware subsystem 521 prepares a response incorporating the authorized data records and responds at 553 to client 511, where the returned records can be displayed on a user interface. The left fork then terminates.

In some circumstances, the count of authorized data records falls short of the target record count T sought to be delivered to the client. In this case, the target record count can optionally be decremented at 561. (Circumstances under which the target record count is not decremented are described elsewhere herein.) At 562, a check is made whether further records are required. If no further records are required, the middle fork and the method are both complete at 565. Otherwise, control passes from marker 563 to marker 564, and the method continues, for retrieval of the next batch of data records. For the right fork, at 571, the middleware subsystem 521 provides a performance indicator to the update module "U" 527 of the learning subsystem, which is received by update module 527 and used to perform a correction or update 572 of prediction module 525.

A First Training Example

In some examples, training can attempt to balance network communication costs with database processing costs. A performance indicator can provide both communication costs and database costs for a retrieve-authorize cycle, or for an entire client request transaction. When retrieval operation count is low, data is retrieved in small batches, and as a result communication cost can be high while database costs can be kept low. When retrieval operation count is high, data is retrieved in large batches, reducing communication cost, but incurring higher database costs when too many available records are retrieved and database resources are wasted. Thus, an update module can decrease retrieval operation count when database costs exceed communication costs, according to selected weighting, and can increase retrieval operation count when communication costs exceed database costs.

In some examples, training can attempt to balance response latency, total response time, and/or resource congestion. As used in this disclosure, response latency is the elapsed time between issuance of a client request for data records and the first receipt of data records at the client. As used in this disclosure, total response time is the elapsed time between issuance of a client request for data records and the fulfillment of the client request, i.e. receipt of all requested data records at the client. In some examples, a leading contributor to these factors is the performance or processing rate of an authorization service. When the authorization service is slow, a high value of retrieval operation count can lead to unacceptable latency, and can also cause resource congestion at the authorization service or elsewhere. In examples, a slow authorization service will desirably be served using a low value of retrieval operation count. When the authorization service is faster, a higher value of retrieval operation count can be used without compromising latency. The higher value of retrieval operation count can also result in fewer retrieve-authorize round-trips, which can lead to lower total response time and also lower overhead costs for communication and other resources.

In some examples, training can use values of yield Y (sometimes, the actual number of authorized records) and goal G (sometimes, the intended number of authorized records) from a number of retrieve-authorize operation cycles. Training can combine multiple yield values and/or multiple goal values to drive corrections to the retrieval operation count. For example, training can operate on the mean error of a preceding set of trials, and attempt to drive the mean error to zero. Training on the mean is just one example of a statistics-based training method that can be used.

A Second Training Example

Figure 6:
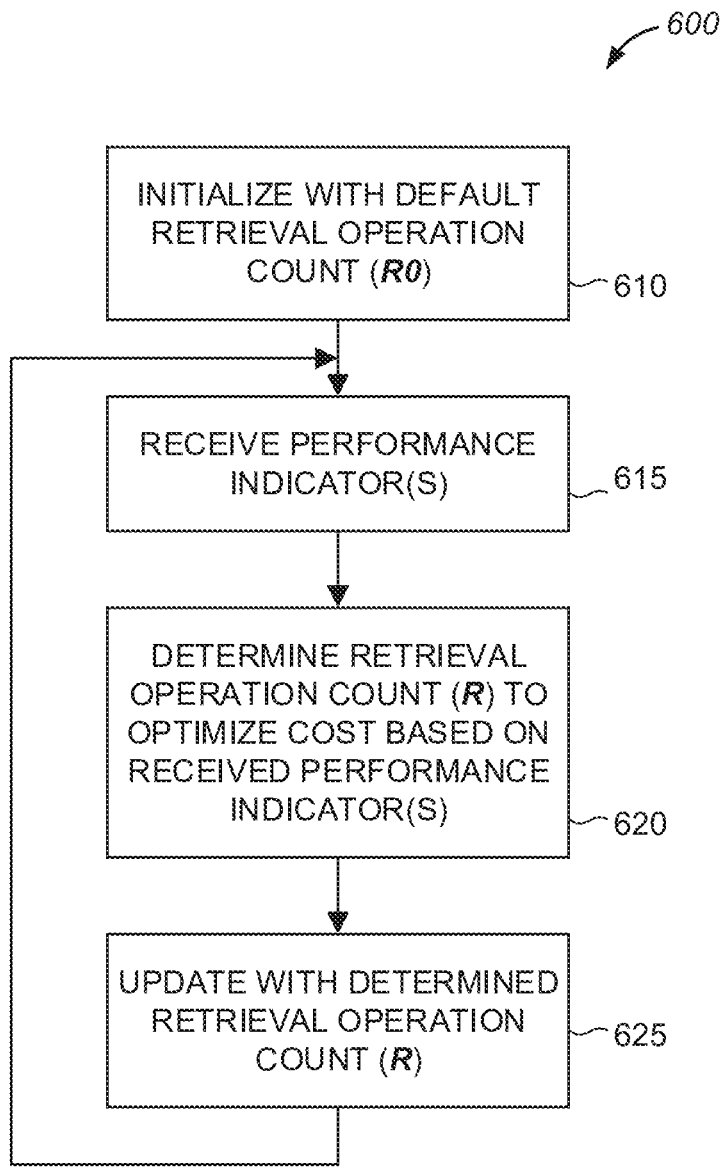
FIG. 6 is a flowchart of a method of training a prediction module, according to disclosed technologies.

FIG. 6 is a flowchart 600 of another method of training a prediction module, according to disclosed technologies. In some examples, this method can be performed at a learning subsystem (similar to 123). At process block 610, the learning subsystem can be initialized with a default value R0 for the retrieval operation count. Thus initial client requests can be serviced using database requests for R0 data records. At process block 615, one or more performance indicators are received. In some examples, the method can proceed to process block 620 after the receipt of a single performance notification, while in other examples the method can dwell at process block 615, receiving a plurality of performance indicators in corresponding performance notifications before advancing to process block 620. Collecting a group of performance indicators can provide averaging and more accurate updates. The dwell at process block 615 can be for a predetermined time, or for a predetermined number of performance indicators or performance notifications. Further, the predetermined number or predetermined time can vary dynamically. For example, the dwell can be short at the outset for quick training, and can be increased as the learning subsystem reaches a stable operating point. In other examples, the dwell can be dynamically decreased if a performance indicator is received that differs from an expected value by more than a threshold amount.

After completion of process block 615, the method proceeds to process block 620, where the received performance indicator(s) are used to determine a retrieval operation count R to optimize a cost measure. Then, at process block 625, the learning module is updated with the newly determined retrieval operation count R. Subsequent client requests can be serviced using database requests for R data records. The method then reverts to process block 615, and the update cycle of process blocks 615-625 repeats.

In an illustration, the dominant cost can be response latency, which can be ascribed to performance of an authorization service, with a secondary cost proportional to number of round-trips. In this illustration, the retrieval operation count that optimizes the overall cost is the maximum value of R (i e minimum number of round-trips) that satisfies a latency constraint. By way of example, a latency requirement imposes a constraint of one second for the maximum time to allowed to the authorization service. Then, with an authorization service that has a processing rate $r_A$ of 10 data record identifiers in one second, R=10 is a suitable value for the retrieval operation count R. Process block 620 can use a formula $R=t_A \times r_A$. At a later time, the authorization service is upgraded, following which the authorization can process 10 data record identifiers in 0.5 seconds, and can process 20 data record identifiers in one second. Then, the learning subsystem can update the retrieval operation count to R=20. At a still later time, due to congestion at the authorization service, the performance drops to a processing rate $r_A$ of 15 data records per second, and the method operates to update the retrieval operation count to R=15. Thus, the method operates to optimize the overall cost and satisfy the latency constraint automatically.

The formula used by process block 620 can alternatively be written in a form $R_2 = R_1 \times (r_{A2}/r_{A1})$, where $r_{A1}$ and $R_1$ denote "old" processing rate and retrieval operation count respectively, and $R_2$ is a "new" retrieval operation count determined from "new" observations of processing rate, $r_{A2}$. In other examples with different cost structures, different formulas or numerical optimization techniques can be used at process block 620. For example, the retrieval operation count R can be a function $R=F(r_A, N, y)$, where F is a function of the processing rate, the number of round-trips N required to fulfill a client request, and y=A/R is the fractional yield of A authorized data records obtained from R retrieved data records. In turn, the number of round-trips N can be expressed as $N=\lceil T/A \rceil = \lceil T/(R \times y) \rceil$, where $\lceil \ \rceil$ denotes the ceiling function, T is the target record count, and A is the number of authorized data records. As an example, with R=20 and y=0.15, on average A=3 authorized data records are obtained on each retrieve-authorize iteration (i.e. on each round-trip). With T=10, $N=\lceil T/A \rceil = \lceil 10/3 \rceil = 4$ (three round-trips not being enough to obtain 10 authorized data records).

A Third Training Example

Figure 7:
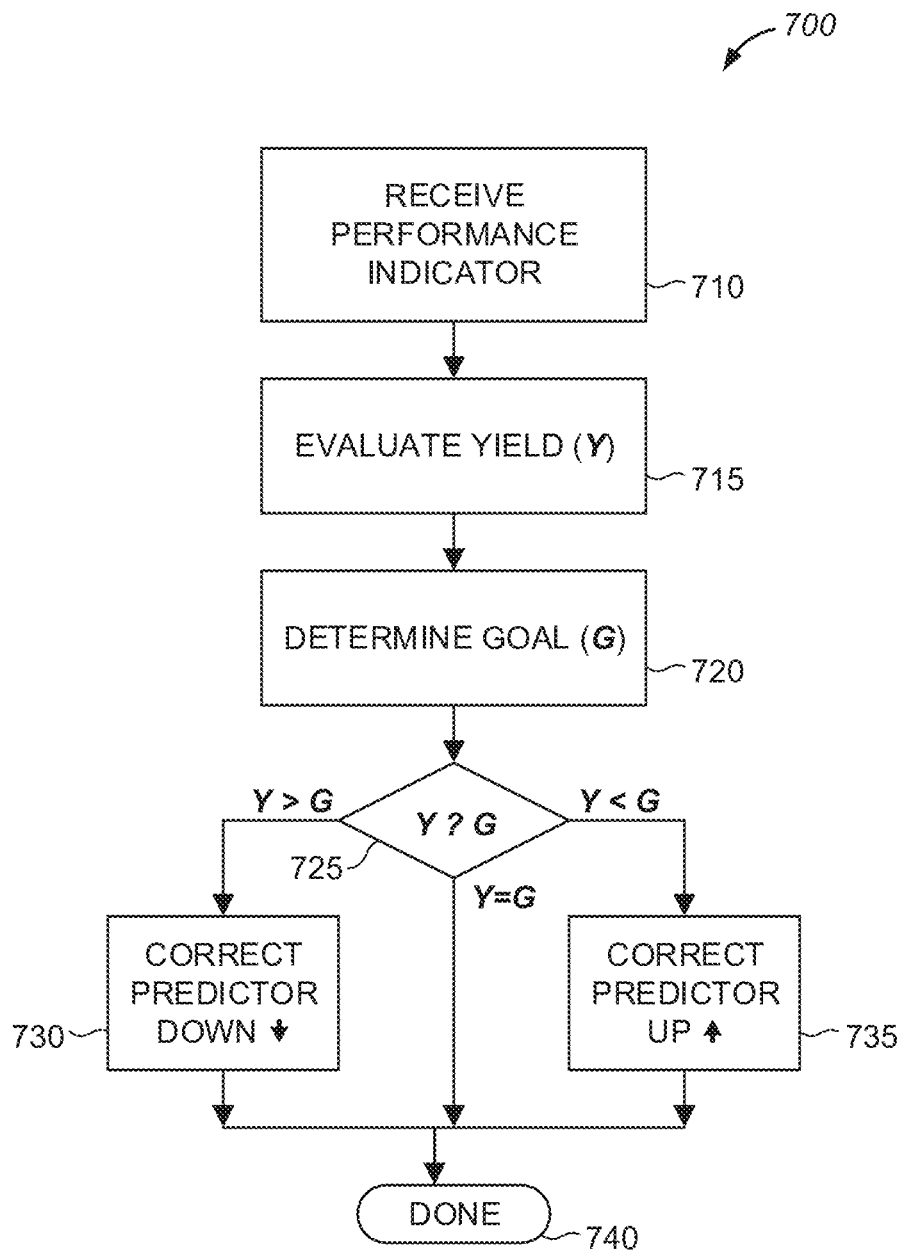
FIG. 7 is a flowchart of another method of training a prediction module, according to disclosed technologies.

FIG. 7 is a flowchart 700 of another method of training a prediction module, according to disclosed technologies. In some examples, this method can be performed at an update module (similar to 127) of a learning subsystem (similar to 123). In brief, the yield Y of a previous operation cycle is compared with a goal G. If the yield is lower than the goal, then the prediction module is adjusted to increase future retrieval operation counts, which should correspondingly increase future yields. If the yield is higher than the goal, then the prediction module is adjusted to decrease future retrieval operation counts, which should correspondingly decrease future yields.

In the discussion above, the yield Y is a measure of the authorized data records obtained at the previous operation cycle, while the goal G is a measure of how many authorized data records the retrieval operation count of the previous operation cycle was intended to provide. In some examples, the yield is identical to the count of authorized data records, and the goal is identical to the target result count T. In other examples, the goal is a function of the target result count, as described further below. In further examples, both the yield and goal are expressed as fractions relative to, for example, the target result count or the retrieval operation count. For the sake of illustration, the discussion of flowchart 700 continues with both yield Y and goal G being numbers of authorized data records.

A process block 710, a performance indicator is received, and at process block 715, the yield is evaluated from the received performance indicator. For example, 20 authorized data records were obtained during an immediately preceding operation cycle, and the yield Y=20 can be extracted directly from the performance indicator. At process block 720, the goal G for the immediately preceding operation cycle is found. In some examples, this can be accessed from a memory or storage location accessible to both the update module and the prediction module.

At process block 725, the yield Y is compared with the goal G. If Y=G, then no update of the prediction module is required, and the method is completed at process block 740. Otherwise, if Y>G, the method proceeds to process block 730, where a correction is made to the prediction module that can lower a future retrieval operation count determined by the prediction module. The correction can be made in various ways, for example, by modifying a parameter used by the prediction module to calculate a retrieval operation count. In other examples, the inner workings of the prediction module can be hidden even from the update module, and the correction is made by an exposed function call of the prediction module that makes a similar change behind the scenes in the prediction module. After this correction has been made, the method terminates at 740. Finally, if Y<G, the method proceeds from 725 to process block 735, where a correction is made that can increase a future retrieval operation count.

Numerous variants of this method can be implemented. For example, a correction can depend on a plurality of yield values, or with weighting of yield values. In examples, a succession of yield values can be processed as a moving average, and a current value of moving average can be compared with the goal to arrive at a correction. Thus, situations could arise where a yield is above the goal, but the moving average is below the goal, resulting in an upward correction. Besides a moving average, other digital filters can be used. Yield values can be weighted, so that a yield value resulting from a T=50 trial can have provide a relatively large correction to subsequent requests for 45<T<55, and a yield value resulting from a T=20 trial can provide a relatively small correction to subsequent requests for 45<T<55. The scope of prediction module corrections from a yield value from a single trial can be selectively limited to similar retrieval count requests, or can be selectively limited by user, by targeted database, by database query type, or by any combination of these or other variables. Similarly, the scope of prediction modules can be distributed across narrow or wide groupings of users, databases, or query types, or over other parameters.

Similar methods can be applied using other performance indicators instead of the yield of authorized data records as described above. For example, latency can be used in place of yield, and the goal can be replaced with a target latency or a maximum acceptable latency. Thus if the latency is found to be too large at decision block 725, then the prediction module can be adjusted to provide smaller values of retrieval operation count at process block 730. Conversely, if the latency is low, then the prediction module can be adjusted to provide larger values of retrieval operation count at process block 735.

Additional Exemplary Features

1. Client Request

A variety of client requests can be employed with the disclosed technologies. Client requests can be explicit, providing an indication of the records sought by a requesting client, or they can be implicit. An implicit client request can be in the form of a message such as "Next" or "Next page," requesting additional records to supplement a previous response, or can simply be in response to a button press, which handled server-side by a client adapter module. An explicit request can contain a direct identification of records sought, a filter, a database query, or some other expression serving to identify or locate matching database records. A client request can also include fields containing a user identifier, a client identifier, a session identifier, an authorization token, a database, table, or other identifier indicating which database, table, or other structure is the target of the client request, a target record count, a starting record identifier, or a mode flag. In a client request, a mode flag can be used to indicate that authorized records should be returned as they are obtained, or accumulated in page lengths or some other batch size.

Like other messages described herein, a client request can be in plain-text, or encoded according to a database query language, or any other protocol, standard, or custom encoding. The client request can be encapsulated according to a protocol layer stack for transmission across a network or local link.

2. Retrieval Count Request

A retrieval count request can be issued by a middleware subsystem to a learning subsystem to obtain a retrieval operation count. In various examples, the retrieval count request can have zero, one, two, three, or more parameters. In some examples, a sole parameter is the target result count T. Effectively, the retrieval operation count answers the question: how many records should be requested from a database in order to yield T authorized data records after an authorization check? As discussed herein, the retrieval operation count can be targeted to a goal G that is offset from the target result count T, to avoid the costs associated with repeated retrieval-authorization cycles or to improve efficiency.

In other examples, the target result count is constant and known implicitly, and a retrieval count request can have zero parameters; the retrieval operation count can nonetheless vary as the yield of successive authorization requests varies, as authorization service performance changes, or as databases evolve, and the learning subsystem attempts to track changing system performance.

In some examples, performance can be homogeneous over the environment, and single training parameter can be effective. However, in other examples, performance can be dependent, even strongly dependent, on parameters other than the target result count T. For example, different users, different target databases, or different database queries can have markedly different rates at which available data records are authorized by an authorization service. Furthermore, different users (or system administrators) can have varying sensitivity to the resource costs associated with fulfilling a client request vs response time. Costs and congestion can also vary, for example, by time of day. Accordingly, the prediction module can operate in a multi-dimensional space, and a retrieval count request can include additional parameters such as user identifier, any filter or database query that is part of the client request, a type of such filter or database query, other relevant parameters, or a mode flag. In a retrieval count request, the mode flag can indicate, for example, whether to optimize for latency, communication cost, or database cost.

3. Database Record Request

A database record request can be issued by a middleware subsystem to a database, to obtain data records satisfying a client request. The record request can have varying numbers of parameters, which can include one or more of a database query, a target number of records, a starting record identifier, a filter, client or user identifiers, a target database identifier, a mode flag, or other parameters and identifiers derived from the client request. In a record request, a mode flag can be used to designate whether records should be returned or record identifiers. As discussed herein, efficiency can be improved, in some examples, by initially retrieving record identifiers, and subsequently retrieving only authorized records. The starting record identifier can be updated in successive iterations of retrieval operations.

In examples, the database record request can be initiated as a stored procedure call by a Java service within a middleware subsystem, which in turn calls a database query, such as a HANA query, within the stored procedure layer. The HANA query is conveyed to the database and retrieves a result set which is returned to the calling Java service.

Filters within requests can be operational horizontally or vertically; that is, filters can select which records to return, or filters can select a subset of record fields or columns to be returned. Filters can be provided in conjunction with or as a substitute for database queries.

4. Authorization Request

An authorization request can be issued by a middleware subsystem to an authorization service, to obtain authorized records from among a set of available records within scope of a client request. In some examples, an authorization request can contain a set of identifiers of the available records, which can be considerably more efficient than including entire records in the authorization request. In other examples, the database records may be relatively small, and the authorization service may be hosted locally to the middleware subsystem and database, in which case the records themselves can be included within the authorization request. Additionally, when the authorization service shares memory with the middleware subsystem or the database, the set of available data records or their identifiers can be passed to the authorization service as a pointer and a count defining an area in the shared memory. The shared memory can be cloud-resident.

Authorization requests can also include a client or user identifier, an authorization token, a filter or other parameter from the client request, a target record count, or a mode flag. The client or user identifier can be required in environments where access permissions are different for different users of clients. The filter can be utilized in situations where data records include, for example, personally identifying information. Thus a request for sanitized records, having personally identifying fields removed, can have a filter indicating removal of such fields, while a similar request for the same records including the personally identifying fields can have a different filter or none at all. Through use of the filter in the authorization request, the authorization service can distinguish between client requests. A higher rate of authorization can be obtained for cases where the filter indicates a request for sanitized records. A mode flag in an authorization request can be used to indicate whether the authorization service can stop processing once the target record count has been met, or whether the authorization service should process all the records included in the request.

5. Performance Notification

In some examples, a performance notification is provided after every retrieve-authorize cycle, as indicated at process blocks 240 or 345. In some examples, a performance notification is provided after completion of a client request transaction, when the original target record count for the client request has been fulfilled.

The performance notification can incorporate one or more of: the count of authorized data records A, a communications performance measure, parameters of the client request such as a filter included within the request, a database query type, or identifiers of the requesting client, a user, or a target database. The performance notification can incorporate one or more of: response latency, total response time, or a performance measure of the authorization service, such as processing time, processing rate, or yield. The communication performance measure can include one or more of an elapsed time, a charged time, or a communication cost, and can pertain to one or both of (a) communication between a middleware subsystem and a database, or (b) communication between a middleware subsystem and an authorization service. Further performance measures can be included, such as the authorization filtering rate, AIR, or a database filtering rate, being a fraction of examined records that met criteria of a client request. A mode flag can be included in the performance notification 6. Handling of Very Large Requested Sizes In some examples, client requests can result in very large numbers of authorized records, up to 10,000, 1,000,000, 100,000,000, or even more. Often, page-based retrieval is well-suited to management of such large result sets. However, in some circumstances, a client can explicitly request a very large number of records, e.g., substantially more than a page length, for example, if the client wishes to apply data analysis, rather than simply display records on a screen. Such examples can be handled by setting the target record count to a modest number, on the order of 100 or 1,000, to avoid congesting computing or network resources, and return records in groups or bursts. In other examples described herein, the target record count could be decremented after each retrieve-authorize cycle (e.g., at process blocks 245 or 360), so that values of T=100, A=80, would result in T=100−80=20 on a subsequent cycle. Furthermore, T=100, A=120, could result in discarding 20 extra data records. Both these actions are unsuitable for a very large request. Thus instead of decrementing T, it can be preferred to hold the value of T at 100 until the client request has been satisfied. Additionally, it can be preferred to accumulate any extra authorized records for a subsequent record group. Each group of T records can be separated by a predetermined delay to avoid congestion for other clients.

7. Relationship Between Prediction Goal and Target Count

Figure 8:
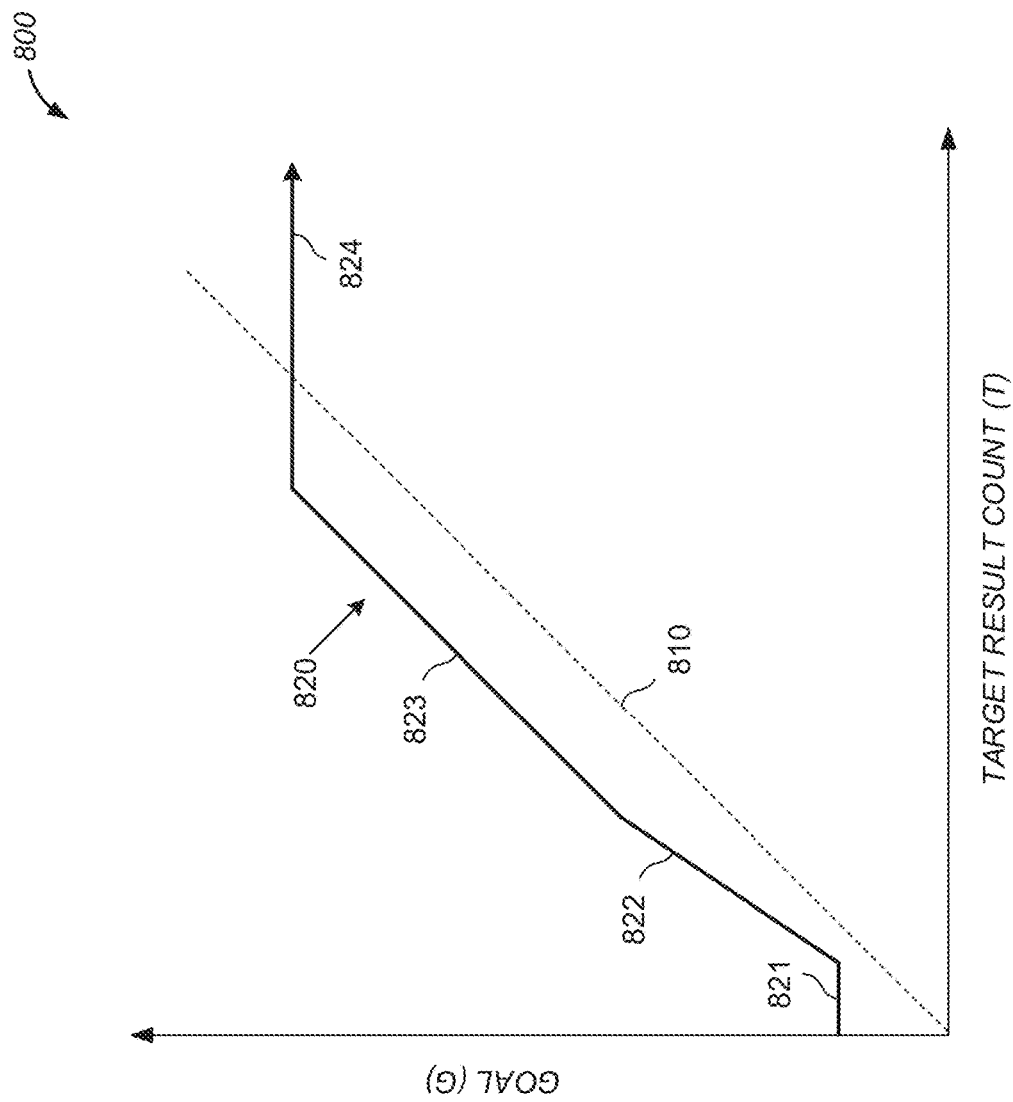
FIG. 8 is a graph indicating a relationship between a prediction goal number and a target result count, according to disclosed technologies.

FIG. 8 is a graph 800 indicating a relationship between a prediction goal number and a target result count, according to disclosed technologies. In short, it may be desirable for the prediction module to aim for a yield that is not exactly equal to the target result count.

By way of example, if the prediction module was perfectly trained and the goal was set equal to the target result count, then requests for, say, 50 data records would result on average in 50 authorized data records as qualified by an authorization server. But, due to statistical fluctuations, some requests could obtain somewhat more than 50 authorized data records while other requests could obtain somewhat less than 50 authorized data records. In some environments, the cost of obtaining a few extra authorized data records can be less, even much less, than the cost of performing another cycle of retrieval and authorization. In such environments, the goal can be set systematically higher than the target result count. An exemplary relationship between goal G and target result count T is described in context of FIG. 8.

For reference, dashed line 810 shows a hypothetical relationship of goal number (on the vertical axis) being exactly equal to the target result count (on the horizontal axis). The actual relationship for this example is shown by the solid segmented line 820.

Segment 821 corresponds to very low values of target result count T. As discussed above, there is not much to be gained by reducing the goal all the way to zero or one. Accordingly, for small target result counts T, the goal number G can be a fixed constant or floor, for example, 10 records. Above this range, segment 822 shows the goal number increasing proportionally as target result count increases, for example, 1.5 times the target result count T. However, in some examples, the variance of the yield increases more slowly than the target result count, and maintaining a proportionate relationship can result in a lot of waste, in the form of extra authorized records, when the target result counts T are large. Accordingly, segment 823 shows the goal increasing with slope 1, and being held at a fixed amount above the target result count T. In other examples, the gap between goal and target result count can vary as $\sqrt{T}$. Finally, segment 824 shows the goal number being held fixed for sufficiently large target result counts. This can be for reasons of display size, or for avoiding resource congestion. Thus, very large target result counts of hundreds or thousands of data records can be fragmented by design into manageable maximum chunks on the order of, for example, 100 data records.

With this disclosure in hand, one of ordinary skill will recognize that FIG. 8 is purely illustrative, and that many variations are possible according to the needs of different environments. Segments can be curved, can exhibit other relationships than those illustrated. Segments can be omitted, and other segments can be added. The floor constant and the maximum chunk size can vary greatly, even by up to several orders of magnitude.

A Generalized Computer Environment

Figure 9:
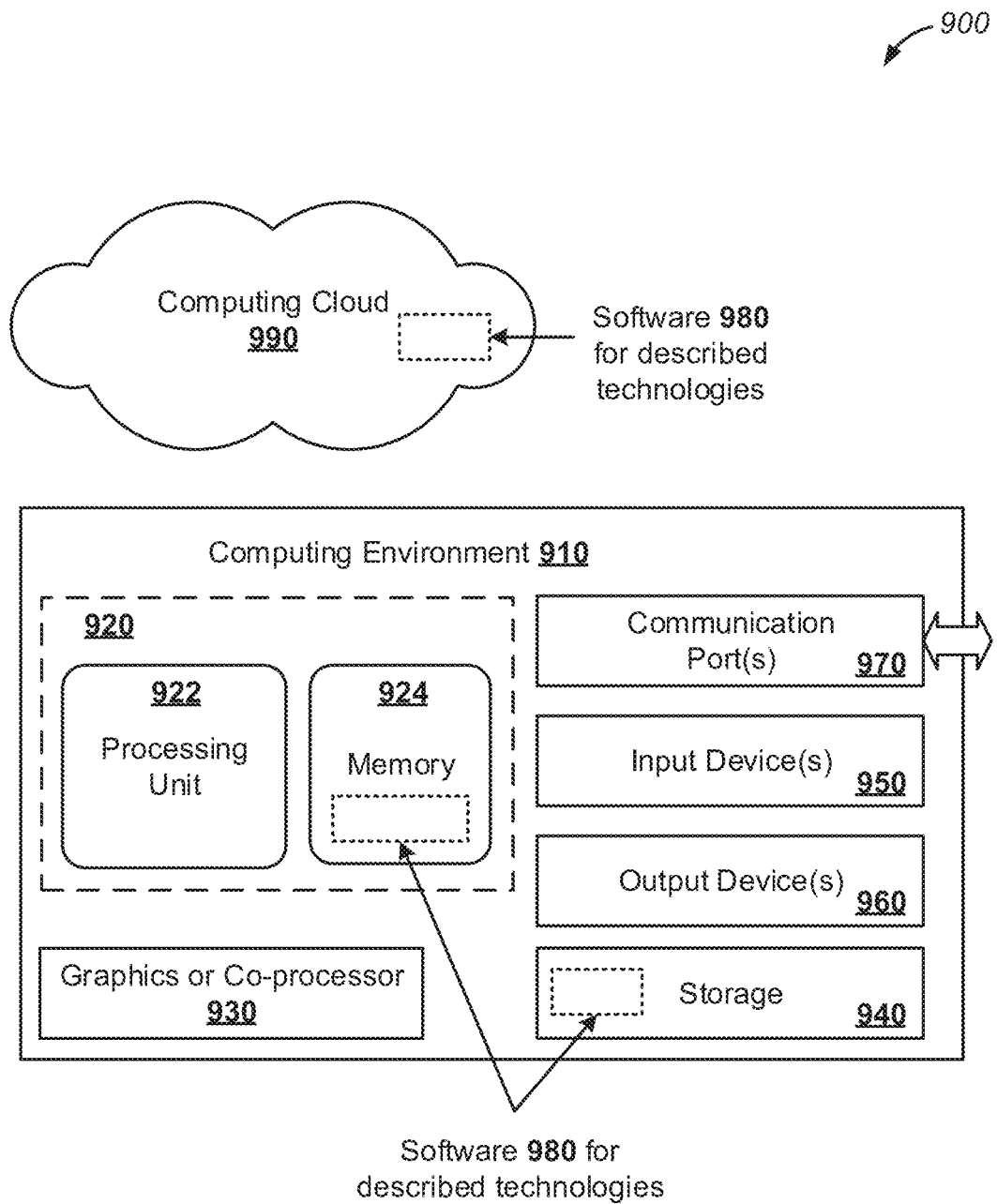
FIG. 9 is a diagram schematically depicting a computing environment suitable for implementation of disclosed technologies.

FIG. 9 illustrates a generalized example of a suitable computing system 900 in which described examples, techniques, and technologies, including construction, deployment, operation, and maintenance of a data retrieval system, can be implemented. The computing system 900 is not intended to suggest any limitation as to scope of use or functionality of the present disclosure, as the innovations can be implemented in diverse general-purpose or special-purpose computing systems.

With reference to FIG. 9, computing environment 910 includes one or more processing units 922 and memory 924. In FIG. 9, this basic configuration 920 is included within a dashed line. Processing unit 922 executes computer-executable instructions, such as for implementing components of middleware subsystem (112, 114, 116, 121, 122, 124, 521), learning subsystem (e.g., 123, 125, 127, 290, 523, 525, 527), databases (e.g., 113a-113n, 270, 513) or authorization services (e.g., 115a-115p, 280, 515), or various other architectures, components, handlers, managers, modules, and repositories described herein. Processing unit 922 can be a general-purpose central processing unit (CPU), processor in an application-specific integrated circuit (ASIC), or any other type of processor. In a multi-processing system, multiple processing units execute computer-executable instructions to increase processing power. Computing environment 910 can also include a graphics processing unit or co-processing unit 930. Tangible memory 924 can be volatile memory (e.g., registers, cache, or RAM), non-volatile memory (e.g., ROM, EEPROM, or flash memory), or some combination thereof, accessible by processing units 922, 930. The memory 924 stores software 980 implementing one or more innovations described herein, in the form of computer-executable instructions suitable for execution by the processing unit(s) 922, 930. The memory 924 can also store database data, data records (421), and sets of identifiers (431), including some or all of accumulator 122. The memory 924 can also store some or all of prediction parameters, and other configuration and operational data.

A computing system 910 can have additional features, such as one or more of storage 940, input devices 950, output devices 960, or communication ports 970. An interconnection mechanism (not shown) such as a bus, controller, or network interconnects the components of the computing environment 910. Typically, operating system software (not shown) provides an operating environment for other software executing in the computing environment 910, and coordinates activities of the components of the computing environment 910.

The tangible storage 940 can be removable or non-removable, and includes magnetic disks, magnetic tapes or cassettes, CD-ROMs, DVDs, or any other medium which can be used to store information in a non-transitory way and which can be accessed within the computing environment 910. The storage 940 stores instructions of the software 980 (including instructions and/or data) implementing one or more innovations described herein.

The input device(s) 950 can be a mechanical, touch-sensing, or proximity-sensing input device such as a keyboard, mouse, pen, touchscreen, or trackball, a voice input device, a scanning device, or another device that provides input to the computing environment 910. The output device(s) 960 can be a display, printer, speaker, optical disk writer, or another device that provides output from the computing environment 910.

The communication port(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 900 can also include a computing cloud 990 in which instructions implementing all or a portion of the disclosed technology are executed. Any combination of memory 924, storage 940, and computing cloud 990 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, neither term implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in one or another form of physical computer hardware.

An Example Cloud Computing Environment

Figure 10:
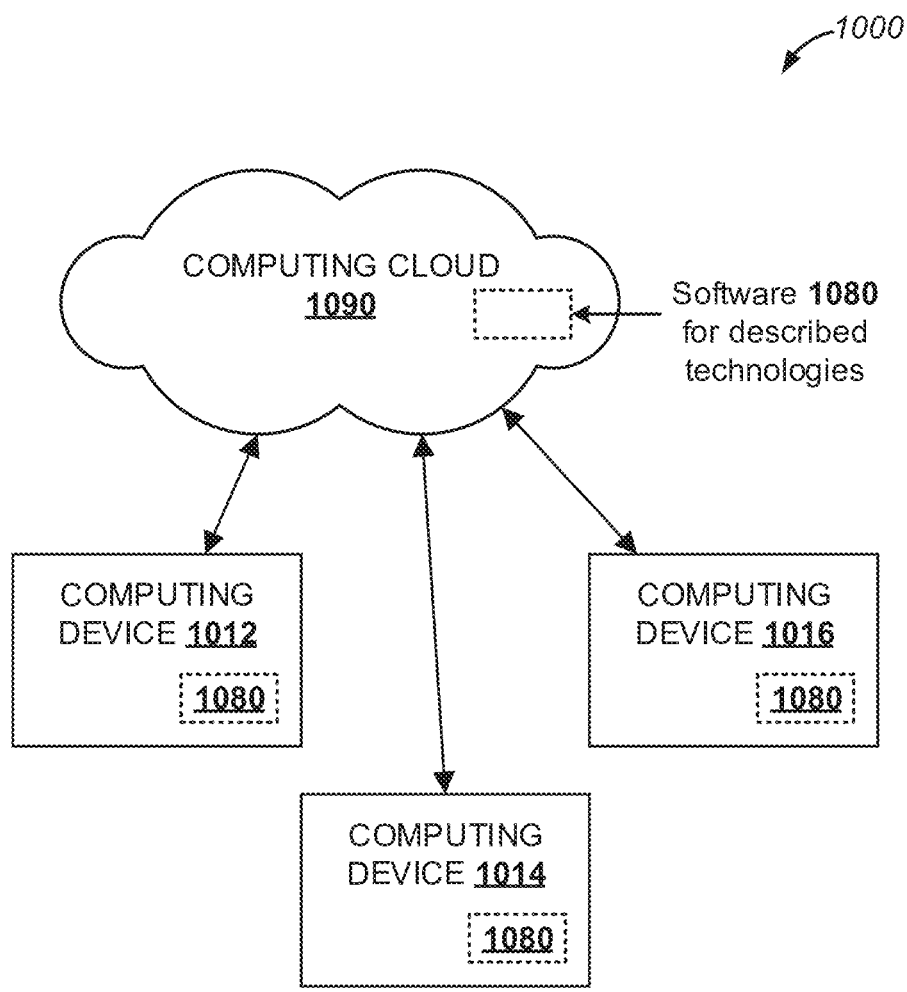
FIG. 10 is a diagram schematically depicting computing devices operating in conjunction with a computing cloud for implementation of disclosed technologies.

FIG. 10 depicts an example cloud computing environment 1000 in which the described technologies can be implemented. The cloud computing environment 1000 comprises a computing cloud 1090 containing resources and providing services. The computing cloud 1090 can comprise various types of cloud computing resources, such as computer servers, data storage repositories, networking resources, and so forth. The computing cloud 1090 can be centrally located (e.g., provided by a data center of a business or organization) or distributed (e.g., provided by various computing resources located at different locations, such as different data centers and/or located in different cities or countries).

The computing cloud 1090 can be operatively connected to various types of computing devices (e.g., client computing devices), such as computing devices 1012, 1014, and 1016, and can provide a range of computing services thereto. One or more of computing devices 1012, 1014, and 1016 can be computers (e.g., server, virtual machine, embedded systems, desktop, or laptop computers), mobile devices (e.g., tablet computers, smartphones, or wearable appliances), or other types of computing devices. Connections between computing cloud 1090 and computing devices 1012, 1014, and 1016 can be over wired, wireless, or optical links, or any combination thereof, and can be short-lived or long-lasting. These connections can be stationary or can move over time, being implemented over varying paths and having varying attachment points at each end. Computing devices 1012, 1014, and 1016 can also be connected to each other.

Computing devices 1012, 1014, and 1016 can utilize the computing cloud 1090 to obtain computing services and perform computing operations (e.g., data processing, data storage, and the like). Particularly, software 1080 for performing the described innovative technologies can be resident or executed in the computing cloud 1090, in computing devices 1012, 1014, and 1016, or in a distributed combination of cloud and computing devices.

General Considerations

As used in this disclosure, the singular forms "a," "an," and "the" include the plural forms unless the context clearly dictates otherwise. Additionally, the terms "includes" and "incorporates" mean "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "access," "apply," "authenticate," "authorize," "determine," "evaluate," "extract," "gather," "inform," "interact," "process," "read," "respond," "train," "update," and "use" to indicate computer operations in a computer system. These terms denote actual operations that are performed by a computer. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 9, computer-readable storage media include memory 924, and storage 940. The term computer-readable storage media does not include signals and carrier waves. In addition, the term computer-readable storage media does not include communication ports (e.g., 970) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ABAP, Adobe Flash, C, C++, C#, Curl, Dart, Fortran, Java, JavaScript, Julia, Lisp, Matlab, Octave, Perl, Python, R, Ruby, SAS, SPSS, SQL, WebAssembly, any derivatives thereof, or any other suitable programming language, or, in some examples, markup languages such as HTML or XML, or in any combination of suitable languages, libraries, and packages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer-implemented system for authorized data retrieval, comprising:
   one or more computing nodes each comprising one or more processors, memory coupled thereto, and one or more network adapters, the one or more computing nodes being interconnected by one or more network connections, the system configured to respond to a request from a client for data records by:
   (a) retrieving, from a learning module, a retrieval operation count predicted to result in a predetermined goal number of records upon a single iteration of the following acts (i) and (ii): (i) execution of a retrieval operation, specifying the retrieval operation count, for the request, then (ii) identifying a subset of authorized data records among intermediate results of the retrieval operation;
   (b) retrieving, from a database, a first plurality of identifiers of available data records up to the retrieval operation count;

(c) sending the first plurality of identifiers of the available data records to a remote authorization service, wherein the identifiers of the first plurality have a 1:1 correspondence with the available data records;

(d) retrieving, from the remote authorization service, a second plurality of identifiers of the authorized data records among the first plurality of identifiers of the available data records, wherein members of the second plurality of identifiers are also members of the first plurality of identifiers, wherein the authorized data records are authorized to be sent to the client based on access privileges of the client, and other data records among the available data records are not authorized to be sent to the client;

(e) sending a performance notification to the learning module indicating a measured performance, wherein the performance notification is based on one or more of:
   a count of the authorized data records;
   a ratio of the count of the authorized data records to the retrieval operation count; or
   a ratio of the count of the authorized data records to a target result count of data records required to satisfy the request from the client;

(f) sending the authorized data records to the client in response to the request; and (g) responsive to receiving the performance notification at the learning module, applying an update procedure to the learning module.

2. The computer-implemented system of claim 1, wherein:
   the middleware subsystem comprises a client adapter module through which the middleware subsystem is coupled to the one or more clients;
   the client adapter module is configured to:
      receive a request message from one of the one or more clients, the request message indicating a request for data records; and
      respond to the request message with a batch of the authorized data records.

3. The computer-implemented system of claim 2, wherein the middleware subsystem further comprises an accumulator, and is configured to:
   form the batch of the authorized data records by accumulating the authorized data records in the accumulator until a count of the accumulated authorized data records is greater than or equal to a batch threshold.

4. The computer-implemented system of claim 1, wherein:
   the middleware subsystem comprises an authorization interface module through which the middleware subsystem is coupled to the external authorization service; and
   the authorization interface module is configured to:
      send, to the external authorization service, a set of identifiers of available data records up to the retrieval operation count; and
      receive, from the external authorization service, a set of identifiers of the authorized data records, wherein the authorized data records are a subset of the available data records.

5. The computer-implemented system of claim 1, wherein the middleware subsystem comprises a retrieval control adapter through which the middleware subsystem is coupled to the learning subsystem, and wherein the retrieval control adapter is configured to:
   receive, from the learning subsystem, the retrieval operation count; and
   send, to the learning subsystem, the one or more measured performance indicators.

6. The computer-implemented system of claim 1, wherein the middleware subsystem is configured to:
   process and respond to requests from the one or more clients;
   interact with the learning subsystem;
   interact with the external authorization service; and
   access the one or more databases.

7. The computer-implemented system of claim 1, wherein the middleware subsystem is configured to:
   receive, from one of the one or more clients, a request message indicating a request for a target result count of data records;
   retrieve, from the learning subsystem, the retrieval operation count;
   retrieve, from at least one of the one or more databases, a set of identifiers of available data records up to the retrieval operation count;
   retrieve, from the external authorization services, a set of identifiers of the authorized data records among the available data records;
   send, to the learning subsystem, the one or more measured performance indicators;
   send, to at least one of the one or more clients, the authorized data records; and
   responsive to a count of the authorized data records being less than the target result count, decrement the target result count by the count of the authorized data records.

8. A computer-implemented method for responding to a request from a client for data records, the method comprising:
   at a computer system, responsive to the request:
      (a) retrieving, from a learning module, a retrieval operation count predicted to result in a predetermined goal number of records upon a single iteration of the following acts (i) and (ii): (i) execution of a retrieval operation, specifying the retrieval operation count, for the request, then (ii) identifying a subset of authorized data records among intermediate results of the retrieval operation;
      (b) retrieving, from a database, a first plurality of identifiers of available data records up to the retrieval operation count;
      (c) sending the first plurality of identifiers of the available data records to a remote authorization service, wherein the identifiers of the first plurality have a 1:1 correspondence with the available data records;
      (d) retrieving, from the remote authorization service, a second plurality of identifiers of the authorized data records among the first plurality of identifiers of the available data records, wherein members of the second plurality of identifiers are also members of the first plurality of identifiers, wherein the authorized data records are authorized to be sent to the client based on access privileges of the client, and other data records among the available data records are not authorized to be sent to the client;
      (e) sending a performance notification to the learning module indicating a measured performance, wherein the performance notification comprises one or more of:

a count of the authorized data records;
a ratio of the count of the authorized data records to the retrieval operation count; or
a ratio of the count of the authorized data records to a target result count of data records required to satisfy the request from the client;
(f) sending the authorized data records to the client in response to the request; and
(g) responsive to receiving the performance notification at the learning module, applying an update procedure to the learning module.

9. The method of claim 8, wherein the request from the client is for the target result count of data records, the method further comprising, at the computer system:
(h) decrementing the target result count by a count of the authorized data records at action (d); and
iterating actions (b)-(e) and (h) until the count of the authorized data records at action (d) is greater than or equal to the target result count.

10. The method of claim 9, further comprising, at the computer system:
initializing the target result count to a maximum number of data records that fit on a display page of the client, prior to action (a).

11. The method of claim 9, further comprising, at the computer system:
performing action (f) after action (d) and before action (g), in each iteration for which the count of authorized data records at action (d) is at least one.

12. The method of claim 9, further comprising, at the computer system:
performing action (f) responsive to an accumulated count of the authorized data records being at least equal to a threshold number.

13. The method of claim 12, wherein the threshold number equals a maximum number of data records that fit on a display page of the client.

14. The method of claim 8, wherein the learning module is locally accessible as part of the computer system.

15. The method of claim 8, wherein the applying the update procedure comprises:
configuring the learning module to provide a retrieval operation count proportional to a processing rate of the remote authorization service.

16. The method of claim 8, wherein the applying the update procedure comprises:
configuring the learning module to provide a retrieval operation count that is a function of one or more of: a processing rate of the remote authorization service, a round-trip count required to service the request from the client, or a ratio of a count of authorized data records to a count of corresponding retrieved data records.

17. The method of claim 8, wherein the retrieving, from the database, the first plurality of identifiers of the available data records further comprises:
receiving the available data records along with the first plurality of identifiers of the available data records.

18. The method of claim 8, wherein the performance notification further comprises one or more of:
a first performance measure of communications with the database;
a second performance measure of communications with the remote authorization server;
a third performance measure of the remote authorization service;
a latency;
a total response time;
a measure of resource congestion;
a filter included within the request; or
a user identifier associated with the request.

19. The method of claim 18, wherein the performance notification comprises at least one of the first and second performance measures, and the at least one performance measure comprises one or more of:
an elapsed time of the corresponding communications;
a charged time of the corresponding communications;
a cost of the corresponding communications; or
a filtering rate of the corresponding communications.

20. One or more non-transitory computer-readable media storing instructions which, when executed by one or more hardware processors, cause the one or more hardware processors to perform operations comprising:
(a) retrieving, from a learning module, a retrieval operation count predicted to result in a predetermined goal number of records upon a single iteration of the following acts (i) and (ii): (i) execution of a retrieval operation, specifying the retrieval operation count, for the request, then (ii) identifying a subset of authorized data records among intermediate results of the retrieval operation;
(b) retrieving, from a database, a first plurality of identifiers of available data records up to the retrieval operation count;
(c) sending the first plurality of identifiers of the available data records to a remote authorization service, wherein the identifiers of the first plurality have a 1:1 correspondence with the available data records;
(d) retrieving, from the remote authorization service, a second plurality of identifiers of the authorized data records among the first plurality of identifiers of the available data records, wherein members of the second plurality of identifiers are also members of the first plurality of identifiers, wherein the authorized data records are authorized to be sent to the client based on access privileges of the client, and other data records among the available data records are not authorized to be sent to the client;
(e) sending a performance notification to the learning module indicating a measured performance, wherein the performance notification is based on one or more of:
a count of the authorized data records;
a ratio of the count of the authorized data records to the retrieval operation count; or
a ratio of the count of the authorized data records to a target result count of data records required to satisfy the request from the client;
(f) sending the authorized data records to the client in response to the request; and
(g) responsive to receiving the performance notification at the learning module, applying an update procedure to the learning module.

* * * * *